Patented Apr. 19, 1938

2,114,605

UNITED STATES PATENT OFFICE 2,114,605

CELLULOSE DERIVATIVE MANUFACTURE

William D. Nicoll, Wilmington, Del., assignor, by mesne assignments, to E. I. du Pont de Nemours & Company, Wilmington, Del., a corporation of Delaware No Drawing. Application November 23, 1934, Serial No. 754,499. Renewed September 18, 1937

8 Claims. (Cl. 260—100)

This invention relates to an improved process for the preparation of alkali cellulose for use in the manufacture of viscose and cellulose ethers.

In the preparation of viscose and cellulose ethers an intermediate in most processes is alkali cellulose. In the manufacture of viscose shredded alkali cellulose is ripened and reacted with carbon disulfide to give cellulose xanthate, which is then dissolved in alkali solution and extruded to give films, bands, threads, tubing and the like. In the manufacture of cellulose ethers many processes react shredded alkali cellu'... e with an etherifying agent such as ethyl cl. ride, methyl sulfate and the like. In both viscose and etherification processes the reaction is essentially a multiphase reaction wherein the solid alkali cellulose reacts with a reagent in another phase.

This invention has as an object the preparation of a shredded alkali cellulose of improved physical characteristics such as small particle size and increased bulk. A further object is the preparation of an alkali cellulose of improved physical characteristics especially adapted for use in the manufacture of viscose and cellulose ethers. A further object is the facilitation of the shredding of alkali cellulose especially of alkali cellulose prepared from caustic solutions about 20% in concentration. A further object is the ready maintenance of lower temperatures during shredding. A still further object is improved viscose filtration. A still further object is improved shredding of alkali cellulose of press weight ratios below 3.0 such as 2.5. Other objects will appear hereinafter.

These objects are accomplished by the following invention wherein alkali cellulose for the manufacture of viscose or cellulose ethers is prepared by steeping cotton linters cellulose in a 16% to 50% solution of caustic alkali in the presence of up to ½% of a wetting agent. Further steps in the invention in the case of viscose manufacture, include the pressing off of the mother liquor so that the weight of the alkali cellulose is not more than 2.8 times the weight of the original air-dry cellulose, shredding, aging, xanthation with not more than 35% of carbon disulfide, based on the dry weight of the cellulose, and dissolving in dilute caustic to form a viscose solution which may be filtered, ripened, and spun in the usual manner; or in the case of the manufacture of cellulose ethers, the alkali cellulose is pressed, shredded, and treated with an alkylating or aralkylating agent to form the desired ether.

In carrying out the various steps of the present invention, it is not necessary to use any radically new or different equipment from that ordinarily used in the present manufacture of viscose. The essential step of the invention, as applied to viscose manufacture, is the use of a wetting agent in the steeping caustic followed by the modification of other steps in the process, such as the use of low-press weight ratios and reduction in the amount of carbon disulfide used in xanthation.

Any organic compound or mixture of organic compounds which is soluble in the caustic solution and capable of effecting a marked decrease in the interfacial tension between cellulose and a mercerizing caustic solution may be taken to be a wetting out agent suitable for use in this invention. The principal agents which have been found to be effective are: alkali metal salts of sulfuric acid esters of saturated aliphatic alcohols having 4 to 8 carbon atoms, phenols, cresols, xylenols, and their homologs, either alone or in combination with aliphatic, aromatic, or alicyclic alcohols, ketones, and ethers of polyhydric alcohols containing free hydroxyl groups and fatty acids sulfonated to such a degree that they are soluble in caustic soda solutions of above 15% concentration. A particularly preferred wetting agent is that wetting agent or class of wetting agents sold under the trade name of "Alkanol M" which are sodium salts of acids prepared by the oxidation of the mixture of oxygenated organic compounds obtained by the catalytic hydrogenation of carbon oxides under elevated temperatures and pressures. Salts of varying characteristics are obtained from different fractions of the alcohols thus obtained, the salts of acids containing 4 to 8 carbon atoms being particularly useful. These acids may be prepared by the processes of U. S. Patent 1,856,263, or by the two-step oxidation of the alcohols to the acids.

These agents are employed with cotton linters cellulose and with any grade of caustic soda of suitable strength for mercerization of cellulose. The efficiency of the wetting agent has been found to increase with the purity of the cellulose and caustic soda employed.

Having outlined above the general principles of the invention, the following applications to the manufacture of viscose are given for purposes of illustration and not in limitation.

Subsequent to steeping cellulose in caustic solution containing one or more of the wetting out agents referred to above, the cellulose is pressed out to a degree such that the total weight of the alkali cellulose is not more than 2.8 times the weight of the original cellulose. This low-press weight, as will be discussed later, permits the use of reduced quantities of carbon disulfide so that after aging the alkali cellulose in conventional manner, it may be xanthated using 10% to 20% less carbon disulfide than is normally required, after which it may be dissolved in dilute caustic soda solution to produce viscose.

The following examples disclose the carrying out of these processes:

*Example 1*

Six hundred parts of cotton linters cellulose in the form of heavy sheets approximately 0.033" thick are steeped for one hour at 18° C. in 6000–8000 parts of an 18% solution of caustic soda containing 0.25% of "Alkanol M". Alkali cellulose formed in this manner is pressed until the weight of pulp and caustic liquor is 2.5 times the original weight of the cellulose and is then shredded or disintegrated in equipment of the type of a Werner & Phleiderer shredder having cutting blades and a serrated saddle and jacketed for cooling the charge. This alkali cellulose disintegrates with reasonable ease altho in the absence of such a wetting out agent alkali cellulose of like press-weight is found extremely difficult to shred. The distintegrated alkali cellulose is next aged at 18° C. for 55 hours in order to reduce the viscosity of the cellulose and is then xanthated during four and one-half hours at 25° C. in a rotating drum, using 30 parts of carbon disulfide to 100 parts of air dried cellulose. The light orange yellow cellulose xanthate formed in this manner is dissolved in an excess of dilute caustic solution in such manner that a viscose solution results containing approximately 7% cellulose and 6% total alkali. In spite of the reduced quantity of carbon disulfide used in the preparation of this viscose, the product is of excellent quality as indicated by the fact that the rate of filtration thru a filter medium composed of closely woven cloth interlayed with cotton batting is decidedly faster than for viscose prepared from the same cellulose by a process involving, for instance, no wetting out agent, higher press-weight, such as 3.0 and 35 parts of carbon disulfide used for 100 parts of cellulose. Furthermore, the low quantity of carbon disulfide used in the formation of this viscose solution greatly minimizes the amounts of objectionable by-products present in the viscose and also reduces the excess carbon disulfide combined with the cellulose which it is believed is the cause of milkiness in yarn.

*Example 2*

As illustrating the improvement due to the use of the wetting agent it was found in another run using the same cotton linters and caustic solution as in Example 1 that it was necessary to increase the press weight to 3.0 and to use 35 parts of carbon disulfide per 100 parts of cellulose but that the quality of the viscose was less satisfactory as indicated by the rate of filtration, which was 27% faster for the viscose of Example 1 than for the viscose of Example 2.

*Example 3*

Viscose is prepared by a process closely resembling that outlined in Example 1 with the exception that a mixture of three parts cresol and 1 part monobutyl ether of ethylene glycol (butyl Cellosolve) is substituted in equivalent quantity for the "Alkanol M" and the aging time of the alkali cellulose is made 65 hours instead of 55 hours. A viscose solution prepared by this process is characterized by substantially the same properties as described for the product of Example 1, with the exception that the solution is of a slightly more reddish color and is found to ripen at a slightly faster rate than viscose prepared by the process of Example 1. The viscose solution filters at a 33% higher rate than when the same linters and caustic solution is used without the wetting agent.

*Example 4*

The process outlined under Example 1 is modified by changing the press ratio from 2.5 to 2.8, increasing the amount of carbon disulfide used during xanthation to 32 parts for each 100 parts of cellulose and reducing the time of xanthation to 3¼ hours at 25° C. The alkali cellulose produced in this case is somewhat easier to shred than that produced by the process outlined in Example 1, but the efficiency of the xanthation reaction is slightly lower due to the increase in free alkali present in the alkali cellulose and, therefore, it is not possible to reduce the amount of carbon disulfide used in this case to quite the same degree as in Example 1 and at the same time produce a viscose of equivalent quality as regards filtration characteristics.

*Example 5*

The process of Example 4 is modified by substitution of an equivalent quantity of a mixture of three parts xylenol and one part butyl Cellosolve for the "Alkanol M" used as wetting agent. The aging time for the alkali cellulose is also increased approximately 15 hours because of a retarding action which the xylenol has on the viscosity reduction of the cellulose. The quality of the viscose produced is substantially the same as obtained with Example 3.

Instead of the conventional type of equipment mentioned in the foregoing example, it is permissible to use other equipment for carrying out any step in the process. Thus, the cellulose linter sheets may be mercerized in the form of a continuous roll by passing thru a caustic bath containing wetting agent and between squeeze rolls to secure low press-weight ratios herein specified. Shredding of the alkali cellulose may also be accomplished in a number of different ways, as by means of the hammer mill, attrition mill, cotton picker or any equipment producing a similar effect. Aging of the alkali cellulose may be reduced or eliminated entirely by various means known to the art, such as high temperature shredding or by the use of pulp of initially low viscosity. The xanthation operation itself may be modified as regards the equipment used, so long as the ratios between carbon disulfide and alkali cellulose are maintained substantially as disclosed.

While the above examples have disclosed the application of the invention to the manufacture of viscose, it is likewise applicable to the manufacture of cellulose ethers. A very important property of alkali cellulose necessary for the production of cellulose ethers of optimum quality is a fine state of division such that a large surface is exposed to the action of the etherifying agent. The presence of a wetting out agent in the steeping caustic greatly facilitates shredding and improves the physical form of the shredded alkali cellulose. This improvement in physical form is reflected in the etherification reaction itself.

The following examples illustrate the use of the invention in the manufacture of cellulose ethers:

Example 6

Purified cotton linters cellulose in the form of thick cardboard-like sheets was steeped in 18% caustic soda containing 0.25% of a mixture of 75 parts phenol and 25 parts of monobutyl ether of ethylene glycol. After one hour in the steeping caustic, the alkali cellulose was removed from the bath and pressed to three times the original weight of the cellulose. This material was shredded and aged for 48 hours at a temperature of 18° C., and then treated at 25° C. with ¼ mol. of ethylene oxide per mol. of cellulose (162). The product obtained was a low substituted glycol ether of cellulose and was found to dissolve completely in an 8% solution of caustic soda to produce a high viscosity solution practically free of undispersed fibers. In contrast to the foregoing, a product produced from the same cellulose using exactly similar conditions in the preparation of alkali cellulose and reaction with ethylene oxide except that no wetting out agent was used in the steeping caustic, was found to be only partially soluble in 8% caustic, producing rough solutions containing considerable quantities of undissolved fibers.

Example 7

One thousand parts of cotton linters cellulose was steeped for one hour at 20° C. in 15,000 parts of 25% caustic soda containing 0.25% (based on the total weight of caustic solution) of "Alkanol M". This alkali cellulose was pressed out to 2.7 times the original weight of cellulose and shredded so as to form fine crumbs. The shredded alkali cellulose was charged into an autoclave together with 1550 parts of solid caustic soda, 4500 parts of benzene, and 3550 parts of ethyl chloride. The autoclave was heated and ethylation allowed to proceed during 6 hours at 150° C. The crude product obtained by this process was purified by steam distillation of the benzene and washing the residue with water. The product obtained was an ethyl cellulose of excellent solubility in mixtures of toluene and alcohol, producing films, filaments, and plastics of superior quality.

Example 8

One hundred parts of cotton linters cellulose was treated in a 25% solution of caustic soda containing in each 100 parts of solution 0.25 part of "Alkanol M". The resulting alkali cellulose was pressed to 300 parts and shredded in the usual manner. This alkali cellulose was treated in a shredder with 50 parts of solid caustic soda and 315 parts of benzyl chloride for 10 hours at 95°– 100° C. The crude mixture obtained by this process was cooled, dispersed in benzyl alcohol, and coagulated in methanol. The coagulated material was washed with methanol, water, dilute acid, and again with water. The benzyl cellulose obtained in this manner was of excellent quality, being especially suited for the preparation of films, filaments, and plastics.

The use of a wetting agent in the caustic steeping bath insures uniformity of reaction between caustic soda and cellulose. The wetting agent also assists the shredding operation, and even favorably influences the physical properties of the alkali cellulose. The improvement in physical properties of the alkali cellulose is such that press-weight ratios may be considerably reduced below the normal value of 3.0 without causing the alkali cellulose to become hard and difficult to shred. The reduction in press-weight ratios has in turn a favorable influence on the xanthation reaction and permits a reduction of from 10 to 20% in the quantity of carbon disulfide used in xanthation without in any way adversely affecting the physical properties of the final viscose.

With respect to the etherification reaction the use of the wetting agent in the caustic steeping bath produces an alkali cellulose of improved physical form and greater surface area which allows a faster and more uniform etherification reaction than that obtained under normal conditions and results in the production of ethers of especially uniform solubility, increased toughness and strength, and excellent working properties.

A property of viscose which is of extreme importance is the dispersion of the viscose as evidenced by the filterability of the viscose solution. The following table indicates the effect of the use of wetting agents on this most important property:

*Effectiveness of wetting out agents in improving viscose filtration*

| Character of cellulose | Wetting agent used | Grams filtered thru ½ sq. in. in 70 min. | Percent improvement due to wetting agent |
|---|---|---|---|
| Cotton linters—A | None | 432 | 64% |
| Cotton linters—A | 0.25% Alkanol M | 707 | |
| Cotton linters—B | None | 637 | |
| Cotton linters—B | 0.25% Alkanol M | 803 | 27% |
| Cotton linters—C | None | 660 | |
| Cotton linters—C | 0.25% Cresol and butyl Cellosolve. | 880 | 33.3% |
| Mixture of linters and wood pulp. | None | 947 | |
| Mixture of linters and wood pulp. | 0.25% Alkanol M | 904 | No effect |
| Mixture of linters and wood pulp. | 0.25% Cresol and butyl Cellosolve. | 973 | No effect |
| Wood pulp | None | 539* | |
| Wood pulp | 0.25% Alkanol M | 558* | No effect |

* The type of filter cloth was not the same in these cases as with others.

It will be noted from the table that the degree of improvement in filterability of viscose produced by the use of such agents as "Alkanol M" or a mixture of cresol and the monobutyl ether of ethylene glycol ranges between about 27% and 64%. It is also of interest to note that the addition of wetting agents in the mercerization of 100% wood pulp or even mixtures of wood pulp and linters has shown little or no advantage, a surprising phenomena in view of the marked advantage with substantially 100% linters and indicative of some as yet undiscovered cooperative effect of the wetting agent on the cotton linters which effect seems to be substantially absent in the case of wood pulp.

The concentration at which the wetting out effect of these wetting agents reaches a maximum varies from about 0.25% up to about 0.35% on the basis of 18% steeping caustic, the exact point of maximum effect depending to some extent on the specific agent used.

In all cases the concentration of the wetting agent is maintained below ½% and in general a concentration at or near that giving maximum wetting out effect under the conditions of use is preferred. This is due not merely to the fact that excess agent is in part wasted but more particularly because the excess agent interferes with other steps in the process, e. g., the coagulation bath. Particularly in the case of agents containing phenols the use of concentrations above the point of maximum effect is objectionable due to the building up of the excess in the coagulating bath and to the difficulty of washing the phenols out of the product.

In addition to the above advantages of the use of these wetting agents in viscose manufacture, it has been found that the yarn made in employing the process of the present invention by reason of the reduced quantities of carbon disulfide used in xanthation has a reduced tendency to milkiness. It has also been found that the reduction in carbon disulfide made possible by the use of the process of the present invention may be such that the viscose need not be ripened in the conventional manner but may be spun almost immediately after preparation.

The above description and examples are intended to be illustrative only. Any modification of or variation therefrom which conforms to the spirit of the invention is intended to be included within the scope of the claims.

I claim:

1. In the process of preparing alkali cellulose and derivatives thereof, the step which comprises steeping cotton linters cellulose in a 16 to 50% aqueous caustic alkali solution containing up to 0.5% of a wetting agent taken from the class consisting of alkali metal salts of acids having 4 to 8 carbon atoms prepared by the oxidation of the mixture of oxygenated organic compounds obtained by the catalytic hydrogenation of carbon oxides under elevated temperatures and pressures, alkali metal salts of sulfuric acid esters of saturated aliphtic alcohols having 4 to 8 carbon atoms, phenols, cresols, xylenols, and their homologs.

2. The process of preparing viscose, which comprises steeping cotton linters cellulose in a 16 to 50% aqueous caustic soda solution containing up to 0.5% of a wetting agent, pressing off the mother liquors so that the weight of the pressed alkali cellulose is not more than 2.8 times the weight of the original air-dry cellulose, shredding the alkali cellulose, ripening, xanthating with up to 35% of carbon disulfide, based on the dry weight of the cellulose, and dissolving the cellulose xanthate in dilute caustic to form a viscose solution said wetting agent being taken from the class consisting of alkali metal salts of acids having 4 to 8 carbon atoms prepared by the oxidation of the mixture of oxygenated organic compounds obtained by the catalytic hydrogenation of carbon oxides under elevated temperatures and pressures, alkali metal salts of sulfuric acid esters of saturated aliphatic alcohols having 4 to 8 carbon atoms, phenols, cresols, xylenols, and their homologs.

3. The process of preparing cellulose ethers, which comprises steeping cotton linters cellulose in a 16 to 50% aqueous caustic soda solution containing up to 0.5% of a wetting agent, pressing, shredding, and treating the shredded alkali cellulose with an etherifying agent of the class consisting of alkyl and aralkyl etherifying agents.

4. The process of preparing viscose, which comprises steeping 600 parts of cotton linters cellulose for one hour at 18° C. in 6000 to 8000 parts of an 18% solution of caustic soda containing .25% of Alkanol M, pressing to 2.5 times the original weight of the cellulose, shredding, aging at 18° C. for 55 hours, xanthating at 25° C. during 4½ hours, using 30 parts of carbon disulfide to 100 parts cellulose, and dissolving in dilute caustic solution to a viscose solution containing approximately 7% cellulose and 6% free alkali.

5. The process of preparing glycol cellulose, which comprises steeping cotton linters cellulose in 18% caustic soda containing .25% of a mixture of 75 parts phenol and 35 parts monobutyl ether of ethylene glycol for one hour, pressing to three times the original weight of the cellulose, shredding, aging for 48 hours at 18° C., and treating at 25° C. with ¼ mole of ethylene oxide per glucose unit of the cellulose.

6. The process defined in claim 1 characterized in that the caustic alkali is caustic soda.

7. The process of claim 1 characterized in that the aqueous caustic alkali solution is an aqueous caustic soda solution containing 0.25% to 0.35% of a wetting agent.

8. The process defined in claim 1 characterized in that after steeping the cellulose is pressed to remove mother liquors so that the weight of the pressed alkali cellulose is not more than 2.8 times the weight of the original air-dry cellulose, and is shredded.

WILLIAM D. NICOLL.